Sept. 27, 1938.  M. FRÄNKL  2,131,102
PROCESS FOR THE OPERATION OF SMELTING AND REDUCING FURNACES
Filed Jan. 22, 1936
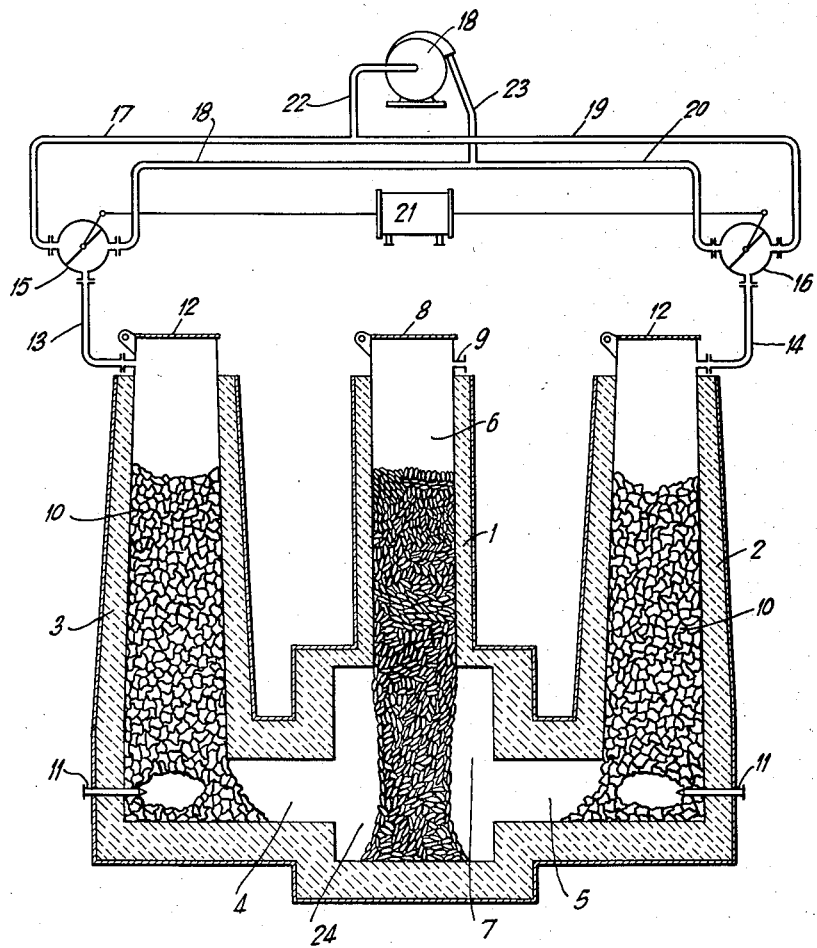
INVENTOR
MATHIAS FRÄNKL.
BY
Watson, Bristol, Johnson & Leavenworth
ATTORNEYS Patented Sept. 27, 1938

2,131,102

UNITED STATES PATENT OFFICE 2,131,102

PROCESS FOR THE OPERATION OF SMELT-
ING AND REDUCING FURNACES

Mathias Fränkl, Augsburg, Germany, assignor to
American Oxythermic Corporation, New York,
N. Y., a corporation of Delaware Application January 22, 1936, Serial No. 60,184
In Germany July 29, 1931

12 Claims. (Cl. 23—208)

The invention relates to a process for the production of materials in smelting and reducing furnaces. It more particularly relates to the operation of such furnaces for the production of metallic carbides and includes correlated improvements and discoveries whereby the production of metallic carbides is enhanced.

In my co-pending application, Serial No. 32355 filed July 19, 1935, which matured into Patent 2,040,651 May 12, 1936, there is described a method for the operation of smelting and reducing furnaces, particularly for the production of steel, in which the furnace is in communication with regenerators and heating of the furnace is effected by means of gases highly heated; partially produced in and passed from a regenerator. The arrangement in my said application comprises a furnace in combination with at least two regenerators. This process effects a considerable economy in furnace operation and it is stated that application thereof may be made with advantage to the production of metallic carbides.

In the practice of my said process there is the attending disadvantage that for the production of carbides it is not possible to attain such a constant ratio in the admixture of charged materials as will admit of the most advantageous formation of the desired carbide.

Accordingly, this process cannot be carried out by the simple manner of introducing the raw materials, as lime or limestone and coal, or silica and coal, or alumina and coal, separately into the shaft of the furnace, inasmuch as the desired proportions of lime and coal, or silica and coal, or alumina and coal, which is necessary for a complete formation of carbide is not effected. In addition, the lime or silica or alumina would melt separately and thereafter combine with the carbon with the result that a large amount of liquid raw material would have to be maintained in the furnace or fusion chamber as a reaction bath. This condition is undesirable for the reason that the molten lime or silica or alumina which has not reacted with carbon to form a carbide, attacks the furnace lining composed of carbon, even though the carbon may be in the form of graphite and finally destroys it. It is an object of this invention to overcome the disadvantages hereinbefore referred to which attend the previous process.

It is a further object of this invention to effect the production of the carbides of calcium, silicon and aluminum in an efficient and economical manner which may be readily carried out on a commercial scale.

It is an additional object of the invention to provide a process in which the materials entering into the production of metallic carbides are introduced into a furnace in a form in which the desired relative proportions are maintained.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention a charge of material consisting of the compound to be reduced and the reducing agent may be introduced into a furnace namely, a reducing zone, having communicating regenerators, i. e., a heat yielding and a heat storing zone containing a regenerative body, such as described in my co-pending application hereinbefore identified and which may contain coal or coke as the regenerative body. The materials to be charged are preferably in a finely ground condition intimately admixed in the required proportions and then formed into briquettes. Such briquettes may be produced in elongated shapes having, for example, a length which is twice the width. When placed in the charging shaft they may be laid layerwise, and the shaft when utilizing such shaped briquettes would have a square cross-section rather than circular, as shown in the drawing. Further, the placement of the briquettes is to be effected in such a manner that they cross each other at the points of contact and, if desired, they may be in the form of rods having a length which is equal to the width of the charging shaft or which shall be one-half or one-quarter of such width. The briquettes so formed contain the reaction materials, as lime and coal, or silica and coal, or alumina and coal in the proper ratio necessary for the production of the desired product. The briquettes are then charged into the furnace and heated by gases highly heated by heat interchange and partially formed by combustion in one of the regenerators, i. e., by direct contact with a regenerative body in a heat yielding zone. The heated gases pass from the reducing zone and are conducted through another regenerator in order to store up at least a portion of the heat content thereof.

The introduction of the reacting materials in the form of briquettes, preferably in elongated shapes, includes the advantage that the melting point is decreased, inasmuch as the latter, as it is known, is always lower for a mixture than the arithmetical mean of the melting points of the substances of which the mixture is composed.

As an illustrative embodiment of a manner in which the invention may be practiced, the following examples are presented:

*Example 1.*—100 parts of lime, that is calcium oxide, or 200 parts of calcium carbonate in finely ground condition are admixed with about 72 parts of finely divided coal and the admixture thus produced formed into briquettes by suitable pressure means. The briquettes are then charged into a furnace in which the reduction is effected and calcium carbide formed.

*Example 2.*—120 parts of silica in finely divided condition are admixed with about 72 parts of coal, also finely divided. The admixture thus produced is then formed into briquettes by suitable pressure means, either with or without the addition of a binding material. The briquettes so formed are introduced into a reducing furnace and the formation of silicon carbide effected under the temperature conditions therein set forth.

*Example 3.*—100 parts of alumina, i. e. $Al_2O_3$, in finely divided condition may be admixed with about 72 parts of finely divided coal or coke. The mixture so produced may then be formed into briquettes of desired shape by suitable pressure means with or without the addition of a binding material. The reducing furnace is charged with the thus produced briquettes and the production of aluminum carbide accomplished under the influence of the high temperature set up in the reducing zone.

It will be understood that the reacting materials may be formed into briquettes in a variety of ways and by any suitable briquetting mechanism. Further, if desired, the materials may be admixed with a small amount of water or a liquid binding material in order to increase the fluidity of the mixture and to assist in the briquetting operation.

A type of furnace suitable for the production of reduction compounds, more particularly carbides of calcium, silicon and aluminum, is illustrated diagrammatically in the accompanying drawing.

The apparatus comprises in combination a reduction furnace 1 communicating with regenerators 2 and 3 by means of channels 4 and 5. The reducing furnace 1 consists of an upper shaft 6 in which the materials are preheated to sintering and reaction temperature, and a hearth portion 7 in which reaction with formation of a carbide is brought about. A cover 8, permitting introduction of reaction mixture, closes the top of the shaft 6, and near the top of such shaft an outlet 9 is provided whereby gases passing up through the reaction mixture in order to preheat the same may be withdrawn. The regenerators which act alternately and periodically as heat yielding and heat storing zones are filled with coal or coke 10, which is burned by the introduction of oxygen thereinto through the orifices or inlets 11. Each regenerator is provided with a closure member 12, and connected near the top of each regenerator are conduits 13 and 14 leading to reversing valves 15 and 16 respectively. By means of a blower 18 connected with the reversing valves 15 and 16, by conduits 17, 18, 19 and 20, respectively, gases may be withdrawn and forced into each of the regenerators.

The flow of the gases is controlled by the reversing valves which in turn are reversed by the reversing mechanism 21, for example, a compressed air engine. If it is desired to pass the gas through the apparatus from regenerator 3 to regenerator 2, the reversing valves are set, as indicated on the drawing. The gases withdrawn from regenerator 2 functioning as a heat storing zone pass through conduit 14, reversing valve 16, conduits 19 and 22 to the blower 18, and thence through conduits 23 and 18, reversing valve 15, and conduit 13 to the top of the regenerator or heat yielding zone 3. The gas heated to a high temperature by the heat previously stored in the coal or coke filling, which constitutes the regenerative body, and by the combustion gases in the regenerator 3, passes through channel 4, about the charge in the hearth 7, raising it to reaction temperature and bringing about melting, and passes therefrom through channel 5 into the regenerator 2 in which sensible heat of the outgoing gases is taken up and stored in the coal or coke filling, or regenerative body. Thence the gases pass through conduit 14 and are returned to the regenerator 3 by means of the blower.

After a period of a few minutes the path of the gas is reversed by operation of the reversing valves by means of the compressed air engine 21, so that now the ingoing gas passes through the regenerator 2 acting as a heat yielding zone, thence about the furnace charge in the hearth 7, and is withdrawn through the regenerator 3 now acting as a heat absorbing zone, and passed back into the cycle through the conduit 13 and reversing valve 15. A portion of the hot gases passes up through the upper shaft of the reducing furnace 6, thereby heating the reaction admixture to a temperature such that when the hearth is reached the mass will be sintered and form a standing column, as shown in the drawing. This column is heated by the highly heated gas mixture thus raising it to reaction temperature and entailing a melting of the outer surface. The melted material will pass to the base of the hearth 24 and is withdrawn therefrom in liquid condition.

When starting the furnace for the production of carbides, the smelting zone or hearth 7 is filled with coke. Upon the coke which fills the hearth and closes the lower end of the shaft 6 there is charged the materials in briquetted form that are to be converted into carbide, for example, lime and coal. Air, or air enriched in oxygen, heated to a temperature of about 500° C., may be introduced through the orifices 11 whereby a part of the coke in the respective generator is ignited and burned. The hot combustion gases in conjunction with the circulating gaseous mixture, heated to a high temperature by contact with the fuel filling in the regenerator, is passed to the smelting space, and the coke filling and the charge in the shaft are heated by the hot gases thus obtained. These gases raise the temperature of the coke and of the material in the shaft resting thereon to a point at which sintering and partial melting take place. The melted material flows down through the heated coke and absorbs carbon therefrom. Thereby the coke is gradually consumed and the charge in the shaft descends until the base of the smelting zone or hearth is reached, and thereafter the reduction or smelting process proceeds in the normal working manner. As the coke gradually recedes, the materials in the shaft passing into the smelting zone are sintered together, thus forming a supporting column such as that shown in the drawing, of which the outer surface and the base melts and passes to the bottom of the smelting zone. The consumption of coke initially charged as a supporting means requires about 10 to 12 hours. When the operation of the furnace has been fully carried out in this manner the further processing, as the formation of carbide, will be brought about continuously under the effect of the gases coming from the regenerators without a further charge of coke upon the hearth being required. In the continued operation of the process the fuel filling of the regenerator that is burned is either replenished by introduction at the top of the regenerator, or the fuel required for combustion may be blown in through the orifices 11 in the form of dust, together with the oxygen enriched air.

This application is in part a continuation of my copending application, Serial No. 568,712, filed October 14, 1931.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the production of metallic carbides, which comprises intimately admixing a reducible oxide selected from the group consisting of the oxides of calcium, silicon and aluminum with a carbon reducing agent, forming such a mixture into briquettes, charging the briquettes into a reducing zone in communication with a solid fuel containing heat yielding zone and a solid fuel containing heat storing zone, effecting reduction by a circulating gaseous mixture heated by contact with the hot solid fuel regenerative body in the heat yielding zone and by combustion gases arising from a simultaneous partial burning of said fuel regenerative body by a gas enriched in oxygen and passed through the reducing zone in contact with the charged briquettes, and withdrawing hot gaseous mixture through the solid fuel regenerative body in the heat storing zone whereby the gaseous mixture is cooled and regenerative body preheated.

2. A process for the production of metallic carbides, which comprises intimately admixing a reducible oxide selected from the group consisting of the oxides of calcium, silicon and aluminum and a carbon reducing agent in finely divided form, forming such admixture into briquettes, charging the briquettes into a reducing zone in communication with a solid fuel containing heat yielding zone and a solid fuel containing heat storing zone, heating to effect reduction by circulating a gaseous mixture which is first heated by contact with a hot solid fuel regenerative body in the heat yielding zone and then by combustion gases arising from a simultaneous partial burning of said fuel regenerative body by a gas enriched in oxygen, passing the thus heated gaseous mixture in direct contact with the charged briquettes in the reducing zone and conducting hot gaseous mixture from the reducing zone through a solid fuel regenerative body in the heat storing zone wherein heat is stored and the gaseous mixture cooled, and then again circulating the gaseous mixture.

3. A process for the production of calcium carbide, which comprises admixing lime in finely divided condition with coal in finely divided condition in quantities required to form calcium carbide, forming the admixture so produced into briquettes, charging said briquettes into a reducing zone in communication with a solid fuel containing heat yielding zone and a solid fuel containing heat storing zone, heating to effect reduction by means of a circulating gas which is first highly heated in the heat yielding zone by contact with a hot solid fuel regenerative body and then by combustion arising from a simultaneous partial burning of said fuel regenerative body by a gas enriched in oxygen, passing the thus heated gaseous mixture in direct contact with the charged briquettes in the reducing zone and conducting hot gaseous mixture from the reducing zone through a solid fuel regenerative body in the heat storing zone wherein heat is stored and the gaseous mixture cooled, and then again circulating the gaseous mixture.

4. A process for the production of silicon carbide which comprises intimately admixing silica and coal in finely divided condition in quantities necessary to form silicon carbide, forming the admixture so produced into briquettes, charging the briquettes into a reducing zone which is in communication with a solid fuel containing heat yielding zone and a solid fuel containing heat storing zone, effecting formation of the said carbide by a circulating gaseous mixture heated by contact with a hot, solid fuel regenerative body in the heat yielding zone and by combustion gases arising from a simultaneous partial burning of said fuel regenerative body by gas enriched in oxygen and passed through the reducing zone in contact with the charged briquettes, and withdrawing hot gaseous mixture through the solid fuel regenerative body in the heat storing zone whereby the gaseous mixture is cooled and regenerative body preheated.

5. A process for the production of calcium carbide, which comprises intimately admixing about 100 parts of calcium oxide and about 72 parts of coal in finely divided condition, forming such admixture into briquettes by pressure, introducing said briquettes into a reducing zone in communication with a solid fuel containing heat yielding zone and a solid fuel containing heat storing zone and heating to effect a reduction by means of a circulating gas which is first highly heated in the heat yielding zone by contact with a hot solid fuel regenerative body and then by combustion gases arising from a simultaneous partial burning of said fuel regenerative body by a gas enriched in oxygen, passing the thus heated gaseous mixture in direct contact with the charged briquettes in the reducing zone and conducting hot gaseous mixture from the reducing zone through a solid fuel regenerative body in the heat storing zone wherein heat is stored and the gaseous mixture cooled, and then again circulating the gaseous mixture.

6. A process for the production of metallic carbides, which comprises charging a mixture of a reducible oxide selected from the group consisting of the oxides of calcium, silicon and aluminum and a carbon reducing agent in the form of briquettes containing the required proportions to produce a carbide into a reducing zone communicating with solid fuel filled heat yielding and heat storing zones, heating the briquettes so charged by means of a gas highly heated in the heat yielding zone, by contact with a hot solid fuel regenerative body and by combustion gases arising from a partial combustion of said fuel regenerative body by a gas enriched in oxygen, and passed in direct contact with the charged briquettes in the reducing zone, withdrawing highly heated gas from the reducing zone through the heat storing zone, and alternately and periodically reversing the flow through said zones.

7. A process for the production of calcium carbide, which comprises charging an admixture of lime and coal in finely divided condition in proportions required to form calcium carbide in the form of briquettes into a reducing zone communicating with solid fuel filled heat yielding and heat storing zones, heating the charged briquettes by means of a gas highly heated in the heat yielding zone by contact with a hot solid fuel regenerative body and by combustion gases arising from a partial combustion of said fuel regenerative body by a gas enriched in oxygen, and passed in direct contact with the charged briquettes in the reducing zone, withdrawing highly heated gas from the reducing zone through the heat storing zone, and alternately and periodically reversing the flow through said zones.

8. A process for the production of silicon carbide, which comprises charging a mixture of silica and coal in finely divided condition in quantities necessary to form silicon carbide in the form of briquettes into a reducing zone communicating with a solid fuel filled heat yielding and a solid fuel filled heat storing zone, heating the briquettes so charged by means of a gas highly heated by passage through said heat yielding zone by contact with a hot solid fuel regenerative body and by combustion gases arising from a partial combustion of said fuel regenerative body, withdrawing highly heated gas from the reaction space through the heat storing zone, and alternately and periodically reversing the flow through said zones.

9. A process for the production of aluminum carbide which comprises intimately admixing aluminum oxide and a carbon reducing agent, forming such a mixture into briquettes, charging the briquettes into a reducing zone in communication with a solid fuel containing heat yielding zone and a solid fuel containing heat storing zone and effecting reduction by a circulating gaseous mixture heated first by contact with a hot solid fuel regenerative body in the heat yielding zone and then by combustion gases arising from a simultaneous partial burning of said fuel regenerative body by a gas enriched in oxygen and passed in direct contact with the charged briquettes in the reducing zone, and conducting hot gaseous mixture from the reducing zone through a solid fuel regenerative body in the heat storing zone whereby heat is stored in said body and the gaseous mixture cooled.

10. A process for the production of metallic carbides, which comprises intimately admixing a reducible oxide selected from the group consisting of the oxides of calcium, silicon and aluminum with a carbon reducing agent, forming such a mixture into briquettes and charging the briquettes into a reducing zone in combination with solid fuel filled heat storing regenerators, effecting heating of the charged mixture by a gas which is heated by contact with heated fuel filling in a first regenerator and by admixture with combustion gases produced by a partial burning of said fuel filling and introduced into the reducing zone whereby reduction ensues, then hot gas from the reducing zone is conducted through a second fuel filled regenerator whereby heat is stored therein and the fuel filling preheated, and alternately and periodically reversing the gas flow through the reducing zone and the regenerators.

11. A process for the production of metallic carbides, which comprises intimately admixing a reducible oxide selected from the group consisting of the oxides of calcium, silicon and aluminum with a carbon reducing agent, forming such a mixture into briquettes having a length which is at least twice their width, charging the briquettes into a reducing zone in communication with a solid fuel containing heat yielding zone and a solid fuel containing heat storing zone, effecting reduction by a circulating gaseous mixture heated by contact with the hot solid fuel regenerative body in the heat yielding zone and by combustion gases arising from a simultaneous partial burning of said fuel regenerative body by a gas enriched in oxygen and passed through the reducing zone in contact with the charged briquettes, and withdrawing hot gaseous mixture through the solid fuel regenerative body in the heat storing zone whereby the gaseous mixture is cooled and regenerative body preheated.

12. A process for the production of metallic carbides, which comprises intimately admixing a reducible oxide selected from the group consisting of the oxides of calcium, silicon and aluminum with a carbon reducing agent, forming such a mixture into briquettes, charging the briquettes into a reducing zone in communication with a charging shaft, a solid fuel containing heat yielding zone and a solid fuel containing heat storing zone, said briquettes having a length which is substantially equal to the width of said charging shaft, effecting reduction by a circulating gaseous mixture heated by contact with the hot solid fuel regenerative body in the heat yielding zone and by combustion gases arising from a simultaneous partial burning of said fuel regenerative body by a gas enriched in oxygen and passed through the reducing zone in contact with the charged briquettes, and withdrawing hot gaseous mixture through the solid fuel regenerative body in the heat storing zone whereby the gaseous mixture is cooled and regenerative body preheated.

MATHIAS FRÄNKL.